United States Patent [19]
Nagano

[11] Patent Number: 5,662,074
[45] Date of Patent: Sep. 2, 1997

[54] EXHAUST PORT TIMING CONTROL APPARATUS FOR TWO-CYCLE ENGINE

[75] Inventor: Toshihiro Nagano, Marugasaki, Japan

[73] Assignee: Fuji Jukogyo Kabushiki Kaisha, Tokyo, Japan

[21] Appl. No.: 571,392

[22] Filed: Dec. 13, 1995

[30] Foreign Application Priority Data

Dec. 22, 1994 [JP] Japan ................... 6-320539

[51] Int. Cl.$^6$ .................................................. F02B 75/02
[52] U.S. Cl. .................................................. 123/65 PE
[58] Field of Search ........................ 123/65 PE, 65 V, 123/65 P, 65 EM; 60/312, 314

[56] References Cited

U.S. PATENT DOCUMENTS

| | | | |
|---|---|---|---|
| 4,391,234 | 7/1983 | Holzleitner | 123/65 V |
| 4,706,617 | 11/1987 | Asai et al. | 123/65 PE |
| 4,776,305 | 10/1988 | Oike | 123/65 PE |
| 4,829,946 | 5/1989 | Boyesen | 123/65 PE |
| 4,993,373 | 2/1991 | Klomp et al. | 123/65 PE |
| 5,063,887 | 11/1991 | Ozawa et al. | 123/65 PE |
| 5,373,816 | 12/1994 | Asai et al. | 123/65 PE |
| 5,410,993 | 5/1995 | Masuda et al. | 123/65 PE |

FOREIGN PATENT DOCUMENTS

| | | | |
|---|---|---|---|
| 56-54336 | 12/1981 | Japan . | |
| 60-3314 | 1/1985 | Japan . | |
| 63-192913 | 8/1988 | Japan | 123/65 PE |
| 1-159414 | 6/1989 | Japan . | |
| 3-260322 | 11/1991 | Japan | 123/65 PE |
| 3-275931 | 12/1991 | Japan | 123/65 PE |
| 4-20979 | 5/1992 | Japan . | |
| 5-9458 | 3/1993 | Japan . | |
| 5-61452 | 9/1993 | Japan . | |
| 1474301 | 4/1989 | U.S.S.R. | 123/65 PE |

*Primary Examiner*—David A. Okonsky
*Attorney, Agent, or Firm*—Martin A. Farber

[57] ABSTRACT

An exhaust port timing control apparatus for a two-cycle engine includes a control valve which is moved upward and downward in the linear direction across an exhaust port by moving the control valve slidably and rotatably around a supporting axis. The control valve is operated by rotating a pivot provided at an end portion of the control valve. Since the control valve moves linearly, the clearance between the control valve and the exhaust port can be kept very small, whereby the leakage of gas out of the cylinder can be minimized and consequently an accurate exhaust port timing control and a stable engine operation are achieved.

6 Claims, 8 Drawing Sheets

1

EXHAUST PORT TIMING CONTROL APPARATUS FOR TWO-CYCLE ENGINE

BACKGROUND OF THE INVENTION

1. Field of the Invention

The present invention relates to an exhaust port timing control apparatus for a two-cycle engine and particularly to an exhaust port timing control apparatus for variably controlling an exhaust port timing by way of a control valve disposed in an exhaust passage of the two-cycle engine.

2. Prior Art

As well known, since an exhaust port of the two-cycle engine is opened or closed by the reciprocating motion of a piston, the exhaust port timing is always constant with respect to the crank angle. Therefore, if the exhaust timing is designed so as to obtain a high power at the high speed operation, the fresh charge exits directly out of the exhaust port at the low speed operation, because the opening period of the exhaust port is rather long at low speed. This phenomenon is a so-called "short-circuiting". On the other hand, if the exhaust port timing is designed so as to obtain a smooth operation at low speed, the engine loses power at the high speed operation because of lowered exhaust efficiency.

Due to this inherent nature of the two-cycle engine, the two-cycle engine has been generally considered to be difficult to obtain a steady performance under any operating conditions.

However, in recent years there are several techniques in two-cycle engines that a steady performance can be secured through the whole operating conditions by means of positively controlling the exhaust port timing. There are several types of the exhaust port timing control apparatus such as a slide valve type, a rotary valve type, a flap valve type and the like.

The slide valve type is composed of a slidable valve coming near to or going away from the exhaust port and these techniques are disclosed in Japanese Examined Utility Model Applications, Jitsu-Ko-Sho 60-3314, Jitsu-Ko-Hei 4-20979, Jitsu-Ko-Hei 5-9458 and an Unexamined Patent Application Toku-Kai-Hei 1-159414.

The rotary valve type is composed of a valve body shaped in hourglass or cylinder which is provided in the exhaust passage and the exhaust port timing is controlled by the rotational angle of the valve body. This technique is disclosed in Japanese Unexamined Utility Model Application Jitsu-Kai-Sho 56-54336 and others.

The flap valve type is composed of a plate shaped valve body pivotally hinged at the rear end thereof and provided above the exhaust port. The exhaust port timing is controlled by the rotational angle of the flap valve around the pivot. This technique is disclosed in Japanese Examined Patent Application Toku-ko-Hei 5-61452 and in U.S. patent application Ser. No. 4,391,234.

However, those apparatuses have problems and disadvantages described as follows.

In the apparatus according to the slide valve, since the valve body is projected in the diagonal direction or in the horizontal direction to close the upper portion of the exhaust port, only step-by-step porting controls such as "low speed"—"high speed" or "low speed"—"medium speed"—"high speed" are available and a continuous control according to the engine speed can not be performed.

On the other hand, in case of the rotary valve type or the flap valve type, it is possible to control the exhaust port timing continuously, but it is impossible to obtain an accurate exhaust port timing, because these valve types have such a construction that the valve body is rotated or swinged in the upward or downward directions and therefore the clearance between the control surface and the cylinder wall surface is increased according to an increase of the rotation or swing angles. This will be described below using FIG. 8 and FIG. 9.

The flap valve 1 is disposed above the exhaust passage 2 and is swingable about the supporting pin 3. The control surface 1a is formed in a curvature along the inner circumference of the cylinder wall 4. The side edge portion of the control surface 1a is close to the side edge 2b of the exhaust port 2a. Referring to FIG. 9, for example, when the flap valve 1 swings downwards as much as 10 mm about the supporting pin 3 from the contact point with the cylinder wall surface, in accordance with the geometrical calculation, the clearance between the contact point and the cylinder wall surface, namely the exhaust port edge is 0.87 mm and the clearance between the side edge and the exhaust port edge is 0.95 mm. Thus, in case of the flap valve of one pin type, the clearances produced between the valve body and the cylinder wall surface can not be avoided. Therefore, it can not be avoided that the fresh charge leaks out of the cylinder through these clearances.

SUMMARY OF THE INVENTION

Accordingly, the present invention is intended to obviate the abovementioned problems and disadvantages of the prior arts and it is summarized as follows.

It is an object of the present invention to provide an exhaust port timing control apparatus for a two-cycle engine by which the exhaust port timing can be variably controlled.

It is another object of the present invention to provide an exhaust port timing control apparatus for two-cycle engine by which the exhaust port timing can be controlled accurately without producing a leakage of the fresh charge.

To achieve the above objects, the exhaust port timing control apparatus according to the present invention comprises following means:

a control vale body;

a guide rail provided in the control valve body;

a recess provided in an exhaust passage for accommodating the control valve body;

a supporting axis connected with a cylinder block for supporting the control valve body slidably along the guide rail and rotatably about the supporting axis;

a pivot provided at an end of the control valve body;

a pivot rotation axis provided in the cylinder block across the recess for rotating the pivot about the pivot rotation axis;

a control valve provided at another end of the control valve body for partly closing or fully opening the exhaust port so as to control the exhaust port timing according to a rotation angle of the pivot about the pivot rotation axis;

a lower edge of the control valve for determining the exhaust port timing;

a hollow provided in the exhaust passage for accommodating the control valve; and linear movement means for slidably moving the lower edge of the control valve body upward and downward in a linear direction across the exhaust port while the lower edge keeps a minimal clearance against the exhaust port when the control valve is moved.

BRIEF DESCRIPTION OF THE DRAWINGS

An embodiment of the present invention will be described with reference to the accompanying drawings, in which.

DETAILED DESCRIPTION OF PREFERRED EMBODIMENTS

Figure 1:
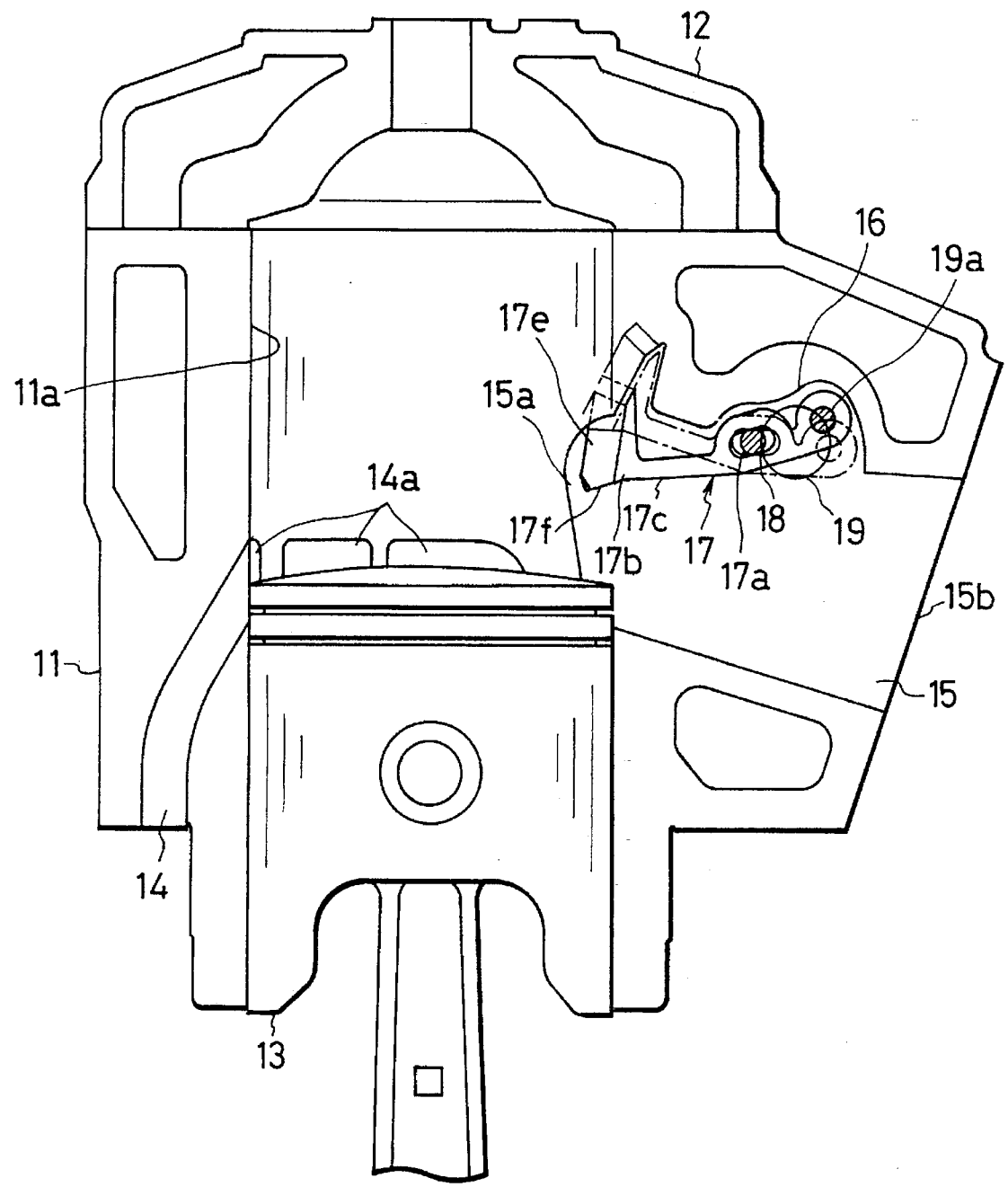
FIG. 1 is a sectional side view showing a two-cycle engine according to the present invention.
Figure 2:
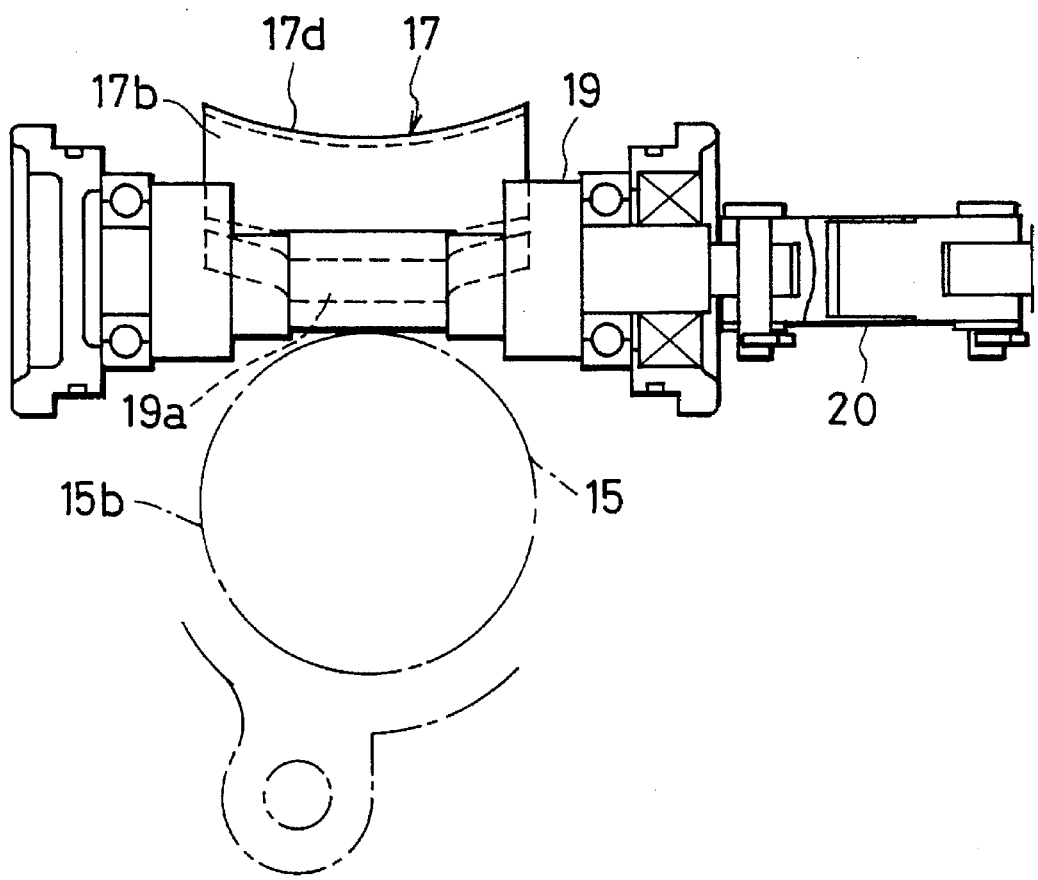
FIG. 2 is a partially sectional view of the engine shown in FIG. 1.
Figure 3:
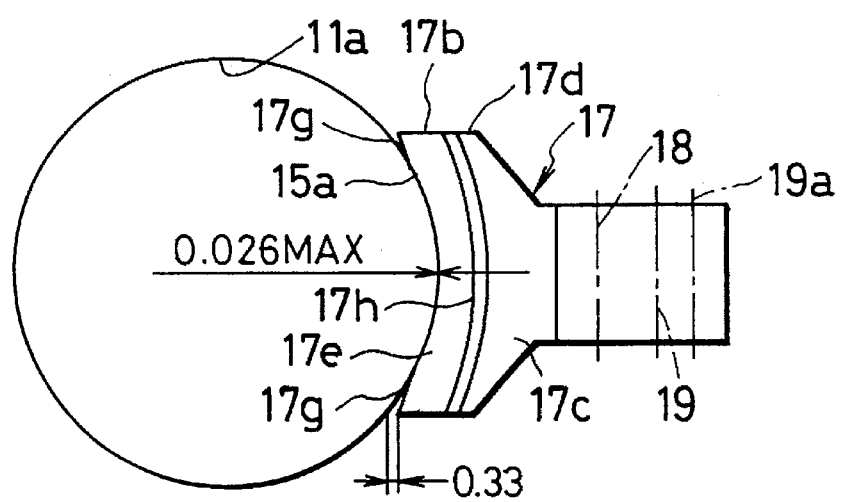
FIG. 3 is a plan view showing a valve body according to the present invention.

Referring now to FIG. 1, numeral 11 denotes a cylinder block of a two-cycle engine, numeral 12 does a cylinder head, numeral 13 does a piston. A scavenging port 14a and an exhaust port 15a are provided on a cylinder wall 11a of the cylinder block 11 respectively. The scavenging port 14a is communicated with a scavenging passage 14 and the exhaust port 15a is communicated with an exhaust passage 15. The scavenging and exhaust are performed by the reciprocating piston 13 which opens or closes those scavenging and exhaust ports.

A control valve body 17 is disposed around a rotating axis 19 provided in the transverse direction of the exhaust passage 15 in a recess 16 which is formed on an upper wall of the exhaust passage 15, The control valve body has an oval-like hole 17a provided at the middle portion thereof extendedly in the direction of the exhaust port 15a and the oval-like hole 17a is slidably connected through by a valve supporting axis 18 whose both ends are connected with the cylinder block 11.

Further, there is provided a pivot 19a at the rear end of the control valve body 17 and the pivot 19a rotates around a pivot rotation axis 9 whose rotating center is located between the valve supporting axis 18 and the pivot 19a. Thus, by the reciprocating motion of the pivot rotation axis 19 the control valve body 17 is rocked and slided in the forward and backward direction and at the same time in the upward and downward direction.

A tip portion 17b of the valve body 17 is formed at the end of an arm 17c which is extended from the middle portion of the control valve body 17 toward the exhaust port 15a. The tip portion 17b is extended upward in a wedge-shaped figure and a tip 17d thereof is cut at an acute angle. Further, on the side facing the exhaust port 15a a control surface 17e is formed for controlling the exhaust port timing. The cross direction curvature of a lower edge 17f of the control surface 17e is approximately the same as the one of the cylinder wall 11a. The cross direction curvature of the side edge 17g is formed so as to be slightly larger than that of the cylinder wall 11a. Further, the whole part of the control surface 17e is also formed with approximately the same curvature as the lower edge 17f.

Referring to FIG. 6, the recess 16 for accommodating the control valve body 17 has a room to allow the rocking motion of itself at the rear part thereof and a hollow 16a having a similar figure to the tip portion 17b is provided therein for accommodating the tip portion 17b of the control valve body 17. The clearance between the hollow 16a and the tip portion 17b is formed so as to be as small as possible. Further, the both sides of the tip portion 17b has also a small clearance with the hollow 16a.

The center portion of the lower edge 17f of the control valve body 17 is moved upward or downward along a vertical center line of the exhaust port 15a while being almost contacted therewith. The rotating center of the valve supporting axis 18, that of the pivot rotation axis 19 and the rotational radius of the pivot 19a are determined according to this movement of the lower edge 17f.

Figure 5:
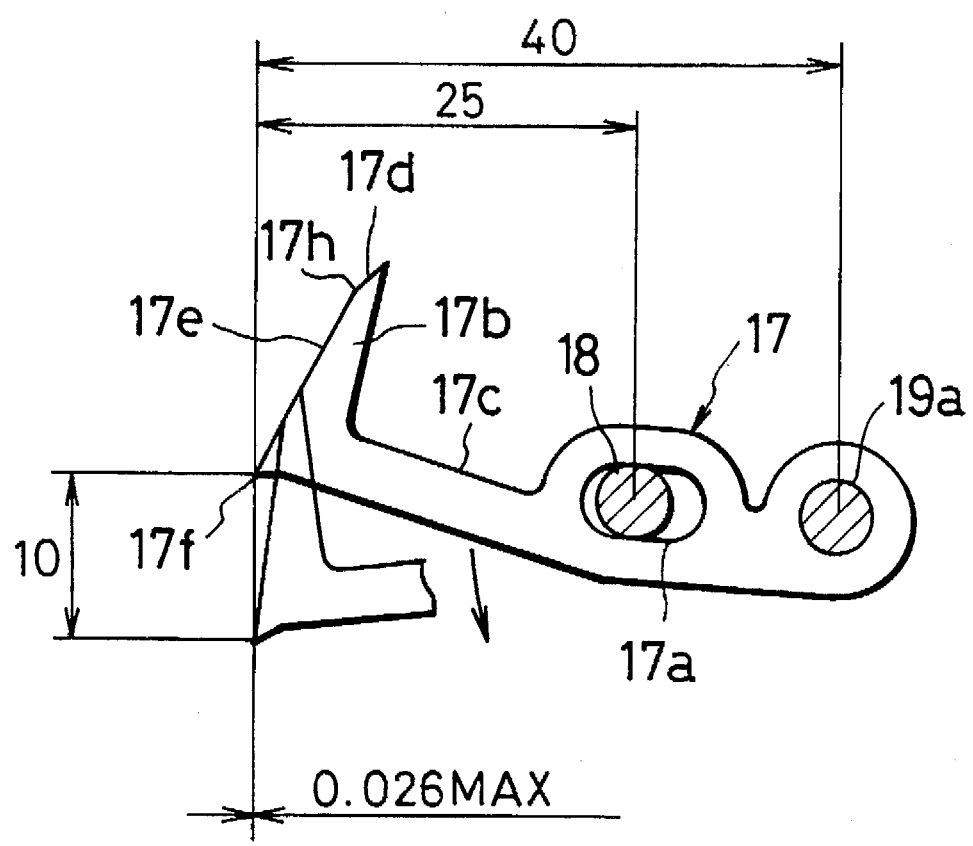
FIG. 5 is a side view showing a valve body according to the present invention.

According to a measurement on an actual engine, as shown in FIG. 5, when the lower edge 17f is moved by 10 mm in the vertical direction, the distance between the center portion of the lower edge 17f and the exhaust port 15a was 0.026 mm at maximum. Further, a wall surface 16b of the hollow 16a is formed such that the minimum and constant clearance is always produced when an upper edge 17h moves with a certain locus. As a result, the lower edge 17f and the upper edge 17h forms a seal face with respect to the upper edge of the piston 13 and the exhaust port 15a, whereby the opening and closing timing of the exhaust port 15a is variably controlled by the upward and downward movement of the control surface 17e.

Figure 4:
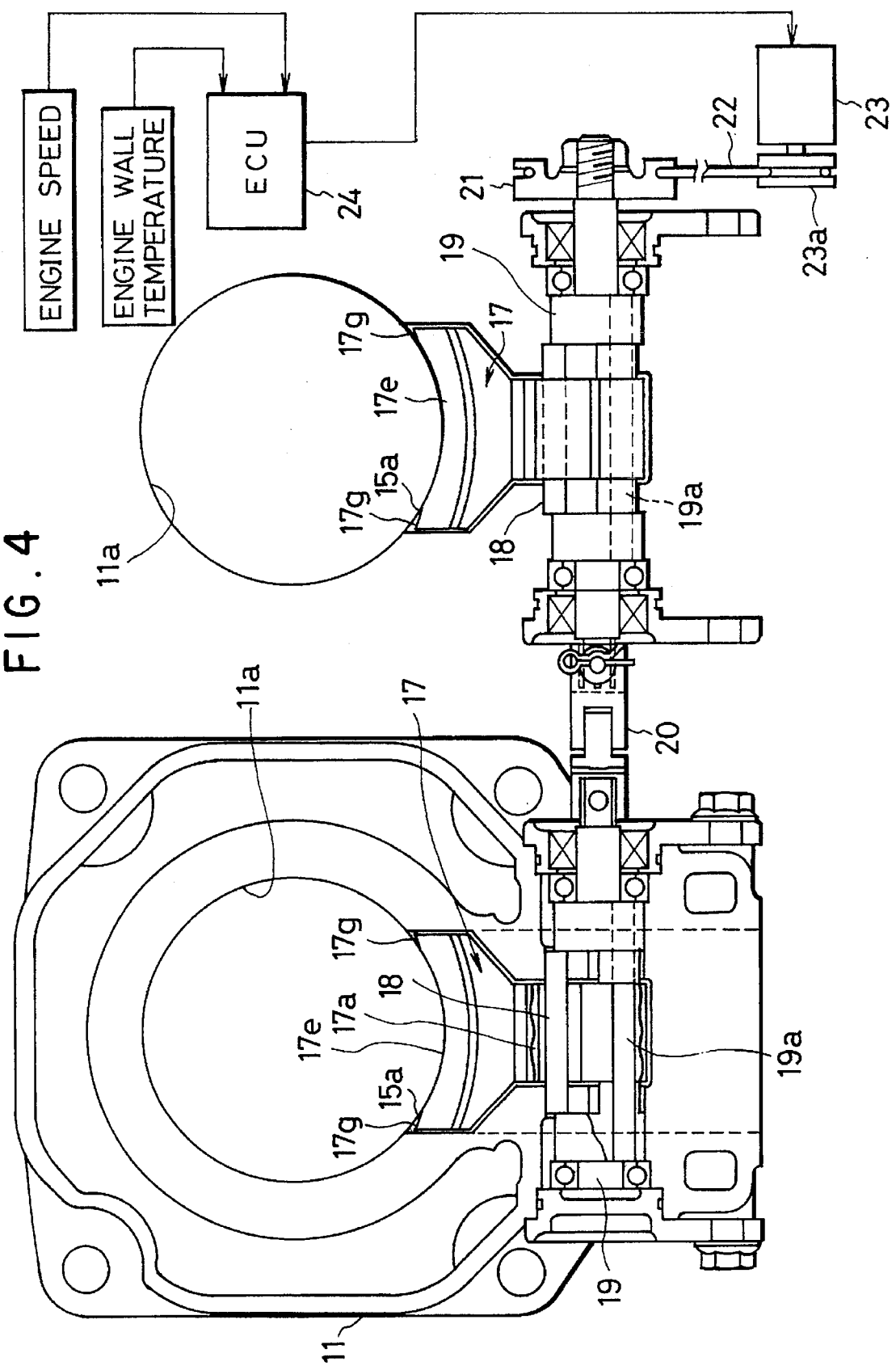
FIG. 4 is a fragmental view showing an exhaust port timing control apparatus according to the present invention.

As illustrated in FIG. 4, in a case of a two cylinder engine, the pivot rotation axis 19 provided in a respective cylinder is connected with each other through a universal joint 20. A pulley 2 is coaxially connected with the pivot rotation axis 19 at one end thereof. The pulley 21 is rotated by a servomotor 23 through a belt 22 and a pulley 23a connected with the servomotor 23. The servomotor 23 is rotated according to the signal from an electronic control unit (ECU) 24. Engine speed information and engine wall temperature information is inputted to the ECU 24 in order to variably control a rotation angle of the servomotor 24, that is to say, the exhaust port timing. In this case, a step motor or a duty solenoid may be used in place of the servomotor 23.

Next, a function of the embodiment thus constituted will be described.

Figure 6A:
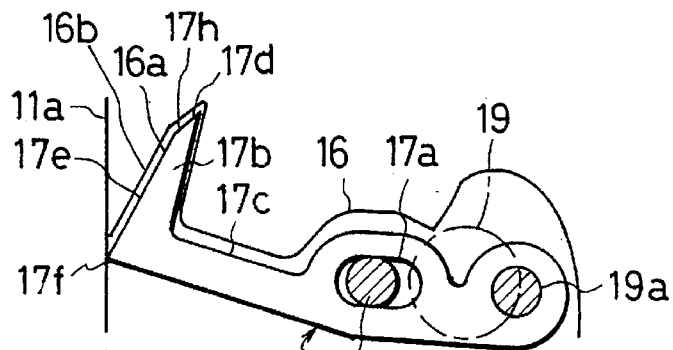
FIGS. 6a–6f are side views showing the modes of the valve body in time series according to the present invention.

The control valve body 17 provided on the upper wall of the exhaust passage 15 is rocked and slided by the rotation of the pivot rotation axis 19. Referring to FIGS. 6a–6f, when the pivot rotation axis 19 is rotated clockwise, the pivot 19a is rotated clockwise and the tip portion 17b is pushed upward due to the supporting of the valve supporting axis 18 and finally the tip portion 17b is accommodated in the hollow 16 provided on the upper wall of the exhaust passage 15, as shown in FIG. 6a.

On the other hand, when the pivot rotation axis 19 is rotated counterclockwise, the tip portion 17b is pushed downward. At this time, since the distance between the pivot 19a and the valve supporting axis 18 becomes gradually small, the center portion of the lower edge 17f goes down along the center line of the exhaust port 15a as shown in FIG. 6b through FIG. 6f. As a result, the lower edge 17f of the control valve body 17 can be moved continuously along the cylinder inner wall 11a in the vertical direction. The rotation angle of the control valve body 17 is predetermined by the control signal outputted from the ECU 24 to the servomotor 23.

At the same time, the control valve body 17 moves with a small clearance between the upper edge 17h and the wall surface 16b of the hollow 16a. Consequently, the upper edge 17h and the lower edge 17f form a seal face for sealing the exhaust gas.

In a state where the control surface 17e is hidden in the hollow 16e as shown in FIG. 6a, the exhaust port 15a is opened early and closed late. Further, according to the disclosure of the control surface 17e to the exhaust port 15a, the opening timing of the exhaust port 15a is gradually delayed and the closing timing is gradually advanced.

Figure 7:
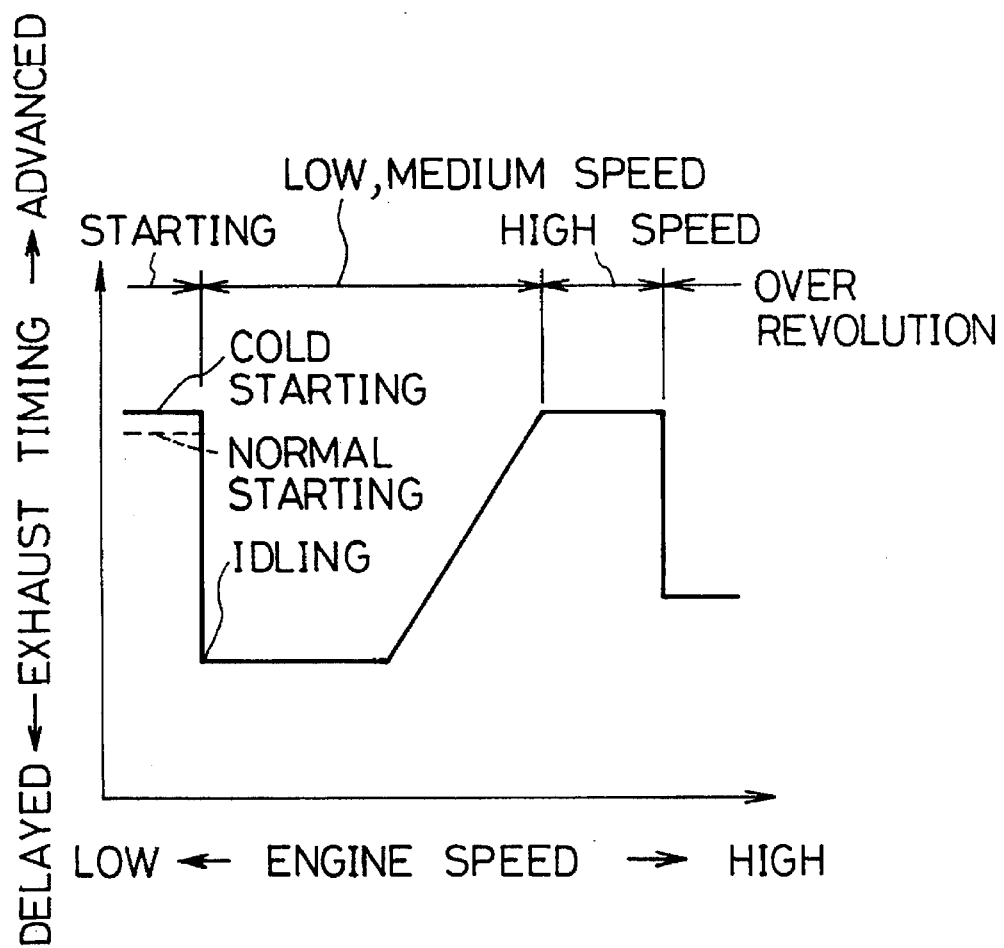
FIG. 7 is a diagram showing an example of a characteristic of an exhaust port timing control according to the present invention.
Figure 8:
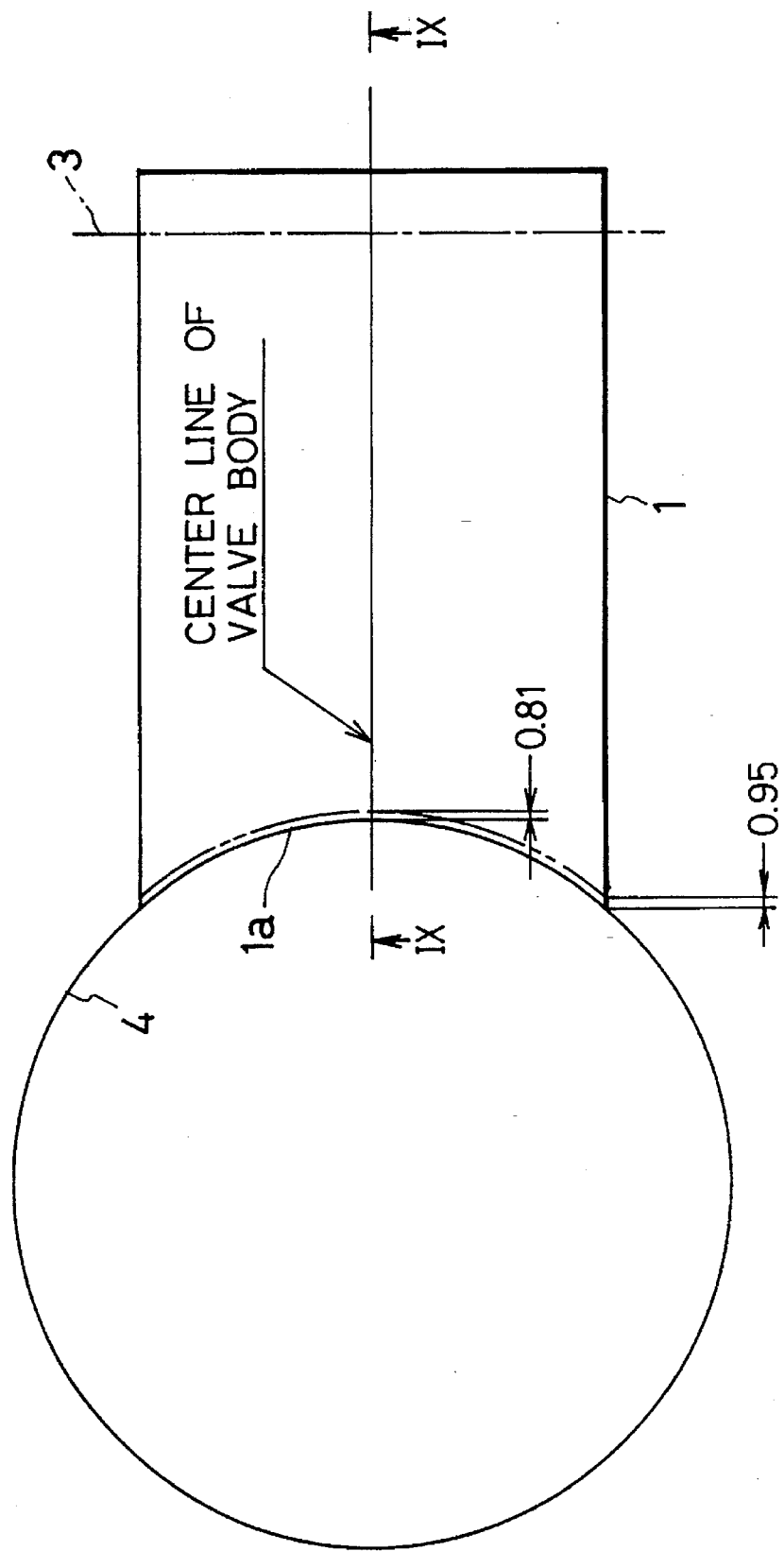
FIG. 8 is a plan view of a valve body according to a prior art.
Figure 9:
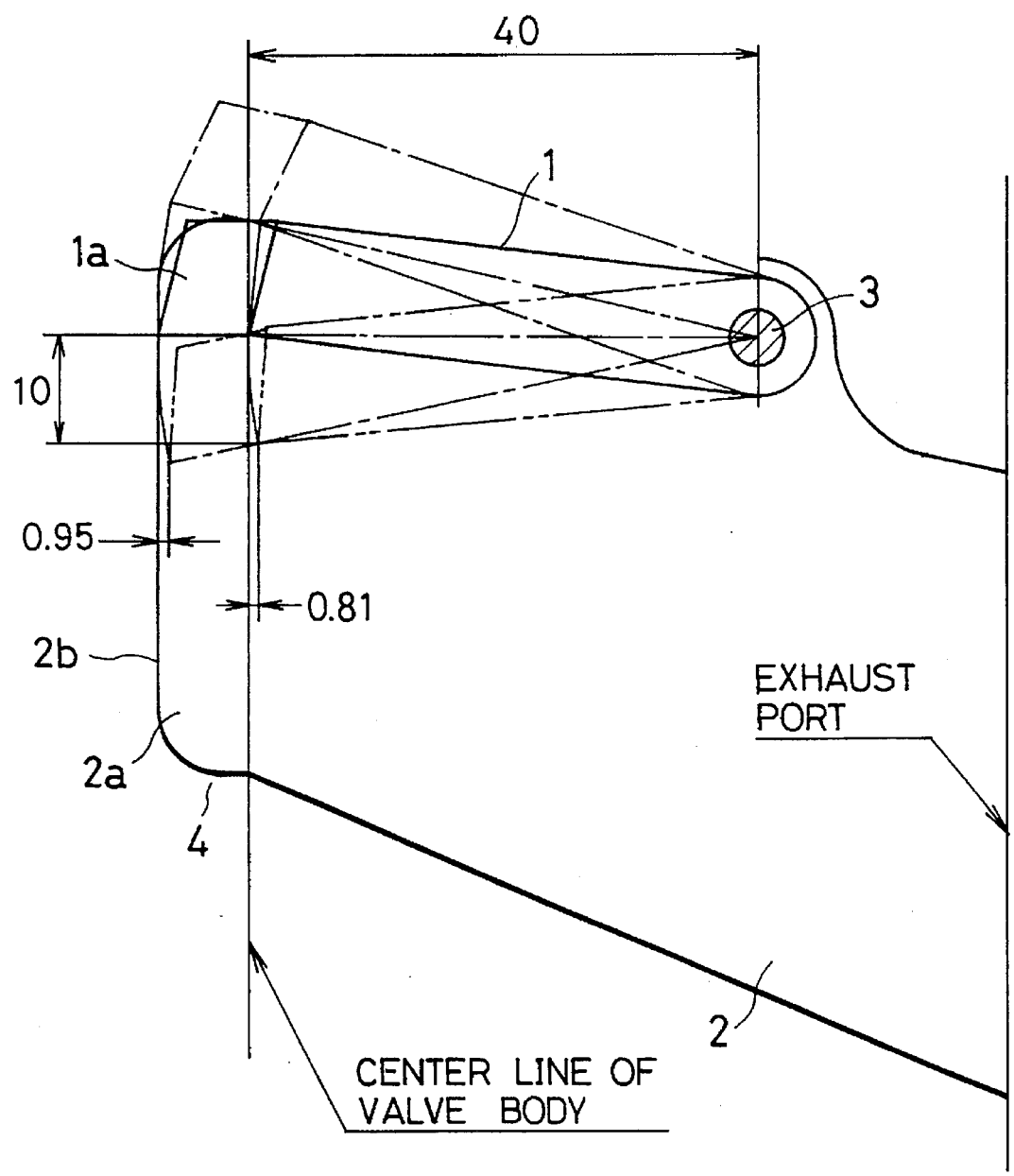
FIG. 9 is a side view of a valve body according to a prior art.

This exhaust port timing is determined based on a map parameterizing the engine speed and the engine wall temperature by the control apparatus 24 which controls the rotation of the servomotor 23. An example of the map is shown in FIG. 7.

At the cold starting where the engine wall temperature is low, the control valve body 17 is accommodated within the recess 16 completely as shown in FIG. 6a. Since the exhaust port 15a is fully open, the exhaust port timing is advanced and the amount of the short-circuiting gas is increased by the advanced exhaust timing. As a result, since the actual compression ratio is lowered, the cranking of the engine becomes easy.

Figure 6B:
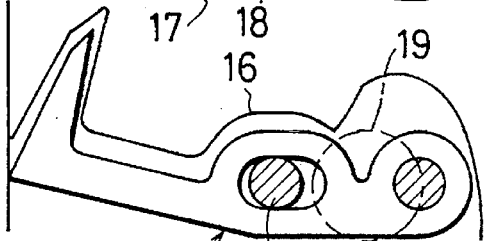
Figure 6C:
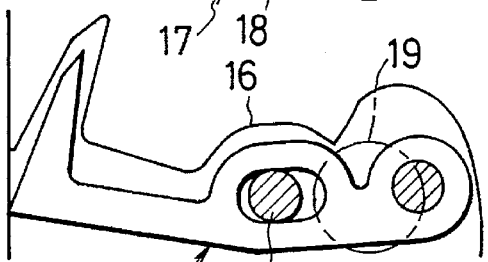
Figure 6D:
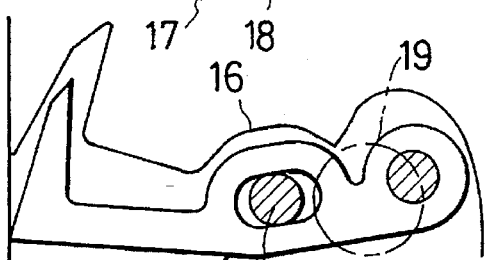
Figure 6E:
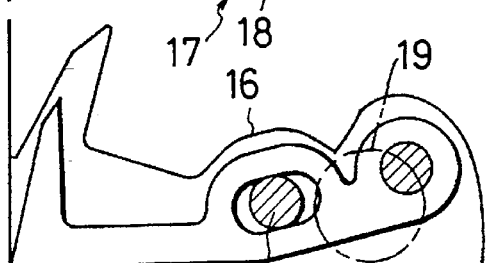
Figure 6F:
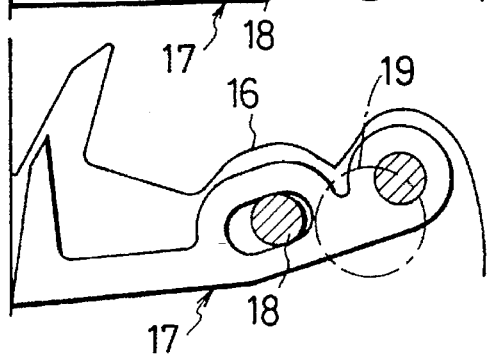

On the other hand, at the normal starting where the engine wall temperature is not so low, the tip portion 17b of the control valve body 17 is slightly pushed down as shown in FIG. 6b to delay the exhaust timing a little bit. Then, the amount of the short-circuiting gas is reduced by the delayed exhaust timing and the compression ratio becomes relatively high, whereby an excellent starting characteristic can be acquired.

Further, when the engine is in the idling condition or in the low to medium speed condition, the control valve body 17 is slanted at the maximum angle in order to open late and close early the exhaust port 15a. That is to say, in the low engine speed zone, since the period per one stroke of the piston is long, the short-circuiting from the exhaust port 15a can be prevented by delaying the timing for opening the exhaust port.

Further, according to the embodiment of the present invention, since the sealing characteristic is secured as described before, it is possible to expect a high accuracy in the establishment of the exhaust port timing and therefore especially in the low and medium speed zone it is possible to obtain a steady performance.

On the other hand, as the engine is transferred to the high speed zone, the tip portion 17b of the control valve body 17 is moved upward and the control surface 17e is gradually immersed into the hollow 16a. Then, the timing for opening the exhaust port is gradually advanced. Finally when the engine reaches the high speed zone, the lower edge 17f comes closest to the upper edge of the exhaust port 15a and the exhaust port 15a is fully opened in order to raise the exhaust efficiency.

Furthermore, when the engine reaches the over-revolution zone, the tip portion 17b of the control valve body 17 is slightly pushed downward to delay the opening timing of the exhaust port 15a. Then, the exhaust efficiency goes down and the over-revolution is suppressed.

In this embodiment, the supporting axis 18 is connected with the cylinder block 11 and the oval-like hole is provided in the control valve body 17. However, as an alternative means, the supporting axis may be fixed on the control valve body and the oval-like hole may be provided in the cylinder block.

In summary, according to the present invention, since the control surface 17e of the control valve body 17 is moved approximately linearly, it is easy to control the exhaust port timing continuously. Further, since the control valve body 17 is constituted such that the distance between the edges of the control surface 17e and the edge of the exhaust port 15a and the clearance between is always kept almost constant and very small during the movement of the control valve body 17, the leakage of the gas can be prevented, whereby an increase of the engine power and a stability of the engine revolution can be secured. Further, since the wall surface 16b of the hollow 16a is formed according to the locus of the control surface 17e of the control valve body 17, the sealing characteristic of the control valve body 17 is further improved and the control accuracy can be further raised.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An exhaust port timing control apparatus of a two-stroke cycle engine having, a cylinder block, a cylinder in said cylinder block, an exhaust port provided in said cylinder, a piston inserted in said cylinder, and an exhaust passage for controlling an exhaust port timing by means of opening and closing said exhaust port by said piston reciprocating in said cylinder, comprising:

a control valve body provided adjacent to said exhaust port;

a guide rail provided in said control valve body;

a recess provided in said exhaust passage for accommodating said control valve body;

a supporting axis connected with said cylinder block across said recess for supporting said control valve body slidably along said guide rail and rotatably about said supporting axis;

a pivot provided at an end of said control valve body;

a pivot rotation axis provided in said cylinder block across said recess for rotating said pivot about said pivot rotation axis;

a control valve provided at another end of said control valve body or partly closing or fully opening said exhaust port so as to control said exhaust timing according to a rotation angle of said pivot about said pivot rotation axis;

a lower edge of said control valve for determining said exhaust port timing;

a hollow provided in said exhaust passage for accommodating said control valve; and linear movement means for slidably moving said lower edge of said control valve body upward and downward in a linear direction across said exhaust port while said lower edge keeps a minimal clearance against said exhaust port when said control valve is moved.

2. An exhaust port timing control apparatus of a two-stroke cycle engine having, a cylinder block, a cylinder in said cylinder block, an exhaust port provided in said cylinder, a piston inserted in said cylinder, and an exhaust passage for controlling an exhaust port timing by means of opening and closing said exhaust port by said piston reciprocating in said cylinder, comprising:

a control valve body provided adjacent to said exhaust port;

a guide rail provided in said cylinder block;

a recess provided in said exhaust passage for accommodating said control valve body;

a supporting axis connected with said control valve body for supporting said control valve slidably along said guide rail and rotatably about said supporting axis;

a pivot provided at an end of said control valve body;

a pivot rotation axis provided in said cylinder block across said recess for rotating said pivot about said pivot rotation axis;

a control valve provided at another end of said control valve body for partly closing or fully opening said exhaust port so as to control said exhaust port timing according to a rotation angle of said pivot about said pivot rotation axis;

a lower edge of said control valve for determining said exhaust port timing;

a hollow provided in said exhaust passage for accommodating said control valve; and linear movement means for slidably moving said lower edge of said control valve body upward and downward in a linear direction across said exhaust port while said lower edge keeps a minimal clearance against said exhaust port when said control valve is moved.

3. The apparatus according to claim 1, further comprising:

rotation control means for controlling said rotation angle of said pivot based on engine speed information and engine temperature information of said engine; and pivot rotating means for rotating said pivot about said pivot rotation axis by an electric servomotor.

4. The apparatus according to claim 1, further comprising:

rotation control means for controlling said rotation angle of said pivot based on engine speed information and engine temperature information of said engine; and pivot rotating means for rotating said pivot about said pivot rotation axis by a step motor.

5. The apparatus according to claim 1, further comprising:

rotation control means for controlling said rotation angle of said pivot based on engine speed information and engine temperature information of said engine; and pivot rotating means for rotating said pivot about said pivot rotation axis by a duty solenoid.

6. The apparatus according to claim 1, wherein said hollow is formed with a minimal clearance against said control valve according to a locus of the movement of said control valve.

\* \* \* \* \*